United States Patent Office 2,827,465
Patented Mar. 18, 1958

2,827,465

PROCESS OF PREPARATION OF 4,4'-DIACETOXY-DIPHENYL 2-PYRIDYL METHANE

André Buzas, Vincennes, Claude Dufour, Puteaux, and Jean Roy, Paris, France, assignors to Frank E. Jonas, New York, N. Y.

No Drawing. Application January 18, 1955
Serial No. 482,669

Claims priority, application France February 6, 1954

6 Claims. (Cl. 260—295)

This invention relates to di-aryl pyridyl methanes and their preparation and more particularly to 4,4'-dihydroxy-diphenyl 2-pyridyl methane having the formula (I)

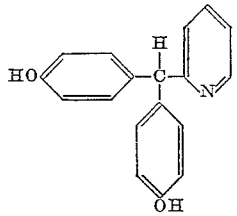

It relates also to the preparation of its esters and ethers derived by the substitution of either or both hydrogen atoms of the phenolic groups by identical or different radicals of the type R—CO or R'—, R and R' designating carbon chains of variable length such as alkyl groups having between 2 and 4 carbon atoms.

The invention relates also to the preparation of the acid addition salts of the above compounds, such as the chlorhydrates, bromhydrates and sulfates as well as those salts resulting from the addition of an organic or mineral acid to the nitrogen atom of the pyridine ring.

The invention particularly comprises the preparation of 4,4'-dimethoxy-diphenyl pyridino acetonitrile, a substance which has not heretofore been described or obtained. By the hydrolysis of the nitrile to the acid and decarboxylation of this latter followed by demethylation of the two phenolic groups, compound I, whose formula has been given above, is obtained. It is, besides, possible to reverse the order of the steps and to effect, first, the demethylation, then the hydrolysis and the decarboxylation.

According to a primary procedure for preparing 4,4'-dimethoxy-diphenyl pyridino acetonitrile, this is obtained through 4,4'-dimethoxy-diphenyl acetonitrile by substituting the end hydrogen atom on the carbon atom in the α-position with respect to the nitrile group by a pyridinyl group; for example, by causing 4,4'-dimethoxy-diphenyl acetonitrile to react on a halogenopyridine, in solution in a suitable solvent, in the presence of an appropriate condensing agent which may be an amide or hydride of an alkali or alkaline earth metal.

According to a secondary procedure for the preparation of 4,4'-dimethoxy-diphenyl pyridino acetonitrile, 4-methoxyphenyl acetonitrile is condensed with a halogenopyridine, in a manner analogous to that set forth above, then there is reacted on the 4-methoxyphenyl pyridino acetonitrile a 4-halogenoanisol, in the presence of a condensing agent, which may be an alkali or alkaline earth amide or hydride, the reaction being effected in a suitable solvent.

According to a third process of preparation, one starts likewise from the pyridino acetonitrile and replaces its two hydrogen atoms located on the carbon atom in the α-position of the nitrile group by two methoxyphenyl groups, by condensation under conditions analogous to those set forth above.

Besides the above three procedures for the preparation of dihydroxy-diphenyl pyridino acetonitrile, the invention further comprises modifications which respond to the description hereinafter given, without limiting the same thereto.

The invention is directed particularly to the procedures and arrangements in question. It is directed particularly also to the dimethoxy-diphenyl pyridino acetonitrile obtained by the putting into action of these arrangements, as well as those arrangements which permit of the conversion of the dimethoxy-diphenyl pyridino acetonitrile to dihydroxy-diphenyl pyridyl methane. These arrangements have been disclosed above and are completed by the description and examples given below. The invention is particularly directed further to the dihydroxy-diphenyl pyridyl methane, a compound which has not heretofore been obtained or described up to now, as well as its derivatives.

The conversion of the dimethoxy-diphenyl pyridino acetonitrile to the dihydroxy-diphenyl pyridyl methane essentially comprises three reactions which may be carried out simultaneously or separately, as follows:

(a) The hydrolysis of the nitrile to the amide and then to the acid;

(b) The decarboxylation of the acid so obtained;

(c) The demethylation of the phenolic groups.

Reaction c may, moreover, be effected either before or after Reactions a and b. The hydrolysis of the nitrile is carried out by heating the product with a suitable hydrating agent, which may be acid or alkaline (for example, sulfuric acid, hydrochloric acid, hydrobromic acid; soda or potash), while operating in a suitable solvent and finally under pressure.

In proceeding at a suitable temperature, in general the decarboxylation immediately follows the hydrolysis in such manner that by concentration and by addition of an appropriate solvent after final neutralization, the product of the reaction crystallizes out.

Demethylation is carried out preferably by boiling in the presence of concentrated hydrobromic acid; nevertheless, one may also utilize other demethylating agents, for example, hydrochloric acid or aluminum chloride.

The conversion of the dihydroxy-diphenyl pyridyl methane to its esters and ethers is made by known processes of esterification or etherification; for example, by acetylation with acetyl chloride or acetic anhydride in the presence of a tertiary base, such as pyridine, or, for the ethers, by the action of an alkyl halide on metallic derivatives of the phenol group, in the presence of a suitable solvent.

An example of acetylation is, moreover, given below.

In carrying out the above procedures, one preferably calculates the quantities of each of the constituents in such manner that they are present, at least approximately, in molecular proportions, except insofar as reactions of hydrolysis and demethylation are concerned which necessitate the presence of an excess of the hydrolyzing or demethylating agent.

EXAMPLE 1

*Preparation of dimethoxy-diphenyl pyridino acetonitrile*

To a suspension of 1 molecular weight of 4,4'-dimethoxy-diphenyl acetonitrile in 500 cc. of anhydrous toluene, 1 molecular weight of 2-bromopyridine and 2 molecular weights of sodamide are added and heated under reflux while agitating until there is cessation of evolution of ammonia. The reaction terminated, it is allowed to cool and the excess of amide is decomposed with ice. Thereafter, the toluene is removed under vacuum and the residue treated with a mineral acid. Insoluble, unreacted dimethoxy-diphenyl acetonitrile is filtered out. By neutralization of the solution, 4,4'-dimethoxy-diphenyl 2-pyridino acetonitrile precipitates. After suitable purification (for example, by crystallization from alcohol, there is obtained a product melting at about 122° C. and having a content of nitrogen, carbon and hydrogen corresponding to that calculated for the above formula.

EXAMPLE 2

*Demethylation of dimethoxy-diphenyl pyridino acetonitrile*

There is heated, under reflux, a mixture of one part of the product obtained according to Example 1 with 5 parts of hydrobromic acid (48%). Methyl bromide is evolved. After a while, a crystalline precipitate appears. This is heated a little longer and then allowed to cool. It is then dried in the open air and washed with water. The product thus obtained is constituted of the bromhydrate of dihydroxy-diphenyl acetamide containing a variable proportion of bromhydrate of dihydroxy-diphenyl pyridyl-methane and of bromhydrate of dihydroxy-diphenyl pyridino acetonitrile.

EXAMPLE 3

100 grams of the product obtained according to Example 2 is added to a solution of 250 grams of potash in 500 cc. of water and boiled under reflux until the evolution of ammonia ceases. The decarboxylation is produced simultaneously. After refrigeration, acidification to pH 5 is carried out. The dihydroxy-diphenyl pyridyl methane precipitates. It is dried in the air and washed in water. After crystallization in alcohol, there is obtained a product melting at about 248–250° C. The dihydroxy-diphenyl pyridyl methane is a white crystalline powder insoluble in water.

EXAMPLE 4

*Preparation of diacetoxy-diphenyl pyridyl methane*

A solution of 1 molecular weight of the product produced according to Example 3 is treated in 200 cc. of pyridine with 3 molecular weights of acetic anhydride for a period of 5 hours at 60° C. and afterwards concentrated under vacuum and then treated with a dilute mineral acid; the acylated derivative is precipitated by addition of sodium carbonate to a pH of 6–7. After suitable purification, the 4,4'-diacetoxy-diphenyl 2-pyridyl methane is obtained in the form of a white, water-insoluble crystallized powder melting at 136° C. By the action of an equimolecular quantity of a mineral acid, such as hydrochloric acid, and evaporation under vacuum, the chlorhydrate of the compound is obtained in the form of a white powder soluble in water.

As will be apparent from what has preceded, the invention is in no way limited to those modes of realization which have been specially indicated but embraces, on the contrary, all variations.

When incorporated in sugar coated tablets containing 5 milligrams of the compound per tablet as the principal active component, the product is useful as a laxative, exerting its laxative action through its vagomimetic properties. Such tablets may be administered as required up to six per day but a dosage of two tablets in the evening upon retiring has been found to produce good results. The precise dosage may be regulated by the individual until the desired extent of laxative action is obtained.

We claim:
1. In a process for the preparation of 4,4'-diacetoxy-diphenyl 2-pyridyl methane, the steps which comprise reacting 4,4'-dimethoxy-diphenyl acetonitrile with a halogenopyridine to form 4,4'-dimethoxy-diphenyl pyridino acetonitrile, and then subjecting the latter compound to hydrolysis, decarboxylation and demethylation.
2. A process in accordance with claim 1, in which the hydrolysis decarboxylation and demethylation are all carried out simultaneously.
3. A process in accordance with claim 1, in which the hydrolysis, decarboxylation and demethylation of the 4,4'-dimethoxy-diphenyl pyridino acetonitrile are carried out in the order named.
4. A process in accordance with claim 1, in which the 4,4'-dimethoxy-diphenyl pyridino acetonitrile is first demethylated and then hydrolyzed and decarboxylated.
5. A process for the preparation of 4,4'-diacetoxy-diphenyl 2-pyridyl methane, which comprises the steps of reacting 4,4'-dimethoxy-diphenyl acetonitrile with a halogenopyridine to form 4,4'-dimethoxy-diphenyl pyridino acetonitrile, subjecting the latter compound to hydrolysis, decarboxylation and demethylation to form 4,4'-dihydroxy-diphenyl 2-pyridyl methane and acetylating the last-named compound to form 4,4'-diacetoxy-diphenyl 2-pyridyl methane.
6. A process for the preparation of 4,4'-diacetoxy-diphenyl 2-pyridyl methane which comprises the steps of adding 1 mol proportion of 2-bromopyridine and 2 mol proportions of sodamide to a suspension in the proportion of 1 mol of 4,4'-dimethoxy-diphenyl acetonitrile in 500 milliliters of anhydrous toluene, heating the whole under reflux and agitation until there is a cessation of ammonia evolution, removing the toluene under vacuum, treating the residue with mineral acid, removing any unreacted 4,4'-dimethoxy-diphenyl acetonitrile by filtration, precipitating 4,4'-dimethoxy-diphenyl 2-pyridino acetonitrile by neutralizing the filtrate, isolating the precipitated 4,4'-dimethoxy-diphenyl 2-pyridino acetonitrile, demethylating the isolated compound with hydrobromic acid under reflux to obtain the corresponding dihydroxy-diphenyl pyridino acetamide bromhydrate, decarboxylating the product of demethylation by boiling it under reflux with aqueous potash to produce the corresponding 4,4'-dihydroxy-diphenyl 2-pyridyl methane and acetylating the demethylated and decarboxylated product with acetic anhydride in pyridine and isolating the 4,4'-diacetoxy-diphenyl 2-pyridyl methane thus produced.

References Cited in the file of this patent

UNITED STATES PATENTS

| | | |
|---|---|---|
| 2,507,631 | Hartmann et al. | May 16, 1950 |
| 2,764,590 | Kottler et al. | Sept. 25, 1956 |

FOREIGN PATENTS

| | | |
|---|---|---|
| 518,457 | Belgium | Mar. 31, 1953 |

OTHER REFERENCES

Chichibabin et al.: Ber. Deut. Chem., vol. 61B, pp. 547–55 (1928).

Tripod et al.: Chem. Abstracts, vol. 48, col. 10920 (1954) (citing Experientia, vol. 10, pp. 261–2, 1954).

Houben: "Die Methoden der Org. Chemie," vol. 3, pp. 172–174 (1943).